(12) United States Patent
Strosser et al.

(10) Patent No.: US 7,707,810 B2
(45) Date of Patent: May 4, 2010

(54) APPARATUS AND METHOD TO VARY THE REEL SPEED VERSUS GROUND SPEED OF AN AGRICULTURAL WINDROWER

(75) Inventors: Richard P. Strosser, Akron, PA (US); Charles H. Hoffman, New Holland, PA (US)

(73) Assignee: CNH America LLC, New Holland, PA (US)

( * ) Notice: Subject to any disclaimer, the term of this patent is extended or adjusted under 35 U.S.C. 154(b) by 923 days.

(21) Appl. No.: 11/487,830

(22) Filed: Jul. 17, 2006

(65) Prior Publication Data

US 2007/0012013 A1    Jan. 18, 2007

Related U.S. Application Data

(60) Provisional application No. 60/699,610, filed on Jul. 15, 2005, provisional application No. 60/699,489, filed on Jul. 15, 2005.

(51) Int. Cl.
*A01D 41/127* (2006.01)
(52) U.S. Cl. .................. 56/10.2 R; 701/36; 701/50; 60/445; 56/10.2 G; 56/11.9; 56/192; 180/53.1; 180/53.4
(58) Field of Classification Search .................. 60/443, 60/445; 701/36, 50, 53; 56/10.2 R, 10.2 G, 56/10.2 H, 10.9, 11.1, 11.8, 11.9, 14.8, 192; 180/53.1, 53.4, 53.6, 53.61, 53.62, 53.7, 180/53.8
See application file for complete search history.

(56) References Cited

U.S. PATENT DOCUMENTS

| | | | |
|---|---|---|---|
| 4,372,265 A | 2/1983 | Kasiewicz | 123/352 |
| 4,414,792 A | 11/1983 | Bettencourt et al. | 56/10.2 |
| 4,458,471 A | 7/1984 | Herwig | 56/10.2 |
| 4,662,472 A | 5/1987 | Christianson et al. | 180/235 |
| 4,967,544 A * | 11/1990 | Ziegler et al. | 56/10.2 R |
| 5,237,883 A | 8/1993 | Churchill et al. | 74/11 |
| 5,310,974 A | 5/1994 | Churchill et al. | 200/566 |
| 5,469,356 A | 11/1995 | Hawkins et al. | 364/424.02 |
| 6,112,139 A | 8/2000 | Schubert et al. | 701/2 |
| 6,169,953 B1 | 1/2001 | Panoushek et al. | 701/99 |
| 6,315,658 B1 | 11/2001 | Weber | 460/6 |
| 6,336,051 B1 | 1/2002 | Pangels et al. | 700/50 |
| 6,542,789 B2 * | 4/2003 | Ufheil | 700/275 |
| 6,546,705 B2 | 4/2003 | Scarlett et al. | 56/10.2 R |
| 6,591,591 B2 | 7/2003 | Coers et al. | 56/10.2 G |
| 6,726,559 B2 | 4/2004 | Bischoff | 460/1 |
| 6,865,870 B2 | 3/2005 | Heisey | 56/10.2 G |
| 6,901,729 B1 | 6/2005 | Otto et al. | 56/208 |
| 2003/0216158 A1 | 11/2003 | Bischoff | 460/6 |
| 2004/0193350 A1 | 9/2004 | Pirotais | 701/54 |
| 2005/0137003 A1 | 6/2005 | Behnke et al. | 460/1 |
| 2006/0213168 A1 * | 9/2006 | Remillard et al. | 56/10.2 R |

* cited by examiner

*Primary Examiner*—Khoi Tran
*Assistant Examiner*—Spencer Patton
(74) *Attorney, Agent, or Firm*—Patrick M. Sheldrake; John William Stader; Michael G. Harms

(57) ABSTRACT

An apparatus and method for varying the speed of a reel versus ground speed of an agricultural windrower, wherein a programmable control module in connection with a signal operated device operable for controlling operation of the reel, is programmed to operate in an automatic mode to control the reel speed as a percentage of the ground speed, while preventing the reel speed from falling below a minimum value.

12 Claims, 26 Drawing Sheets

```
1 /* MODULE:        Reel_Cntrl.006.c    rps2005feb160649

DESCRIPTION:   The reel speed sub-system will use a (2) point calibration. The the operator will be required
5                   and select the Reel Speed Calibration. Information on the (4) line display will guide the Deal
                    ERPM to high idle, Engaging the PTO Emergency Stop. The XCM will apply 1100ma and the Reel wil
                    advise the operator to depress the Reel Speed Increment Switch and begin counting the number of
                    should be marked with a piece of duct tape or similar marking means to allow the operator to ea
                    operator will be advised via an audible alarm and display prompt to stop counting. The operato
10                  the count shown on the display, using the horizontal select keys, to match the operator's count Once the operator has entered his count, he will be prompted to to depress the Reel Speed incre
                    revolutions of the Reel a second time. The operator will be advised via an audible alarm and d
                    will then be asked to increment or decrement the count shown on the display, using the horizont
15                  The count should be close to 80 for (6) cylinder models and 90 for (4) cylinder models.

The control system will now have enough information to calculate the current setpoints to produ
                    The control system will assume linear operation between these (2) points.

20
     REVISION HISTORY:
         rps2005feb140730
         18-Jun-2002 0629      (rstross)
25       jpeters2003Feb071911
         Reel_Cntrl.003.c - 12-Apr-2004 rfackler
         Reel_Cntrl.004.c - 11 May-2004 rfackler

*/
30 #include "alarm.h"
   #include "can1_out.h"
   #include "changes.h"
   #include "Dsplxmit.h"
   #include "fox.h"
35 #include "Gnd_speed.h"
   #include "header.h"
   #include "main.h"
   #include "menu.h"
   #include "neustart.h"
40 #include "Pto_Switch.h"
   #include "Reel_Cntrl.h"
   #include "Reel_Icntrl.h"
   #include "Reel_Switch.h"
   #include "Sys_vars.h"
45 #include "throttle.h"
   #include "Timer.h"

50 /*****************
      DEFINITIONS
```

*Fig. 3*

```
/******************/
    // CONSTANT

55
        #define    _v_MIN_RPM_b3              velocity_rpm_b3_ui( 20.00 )
        #define    _v_MAX_RPM_b3              velocity_rpm_b3_ui( 78.00 )

60      #define    _v_min_CURRENT_ma_b3_ui        current_ma_b3_ui(  800 )     //Default...Calibration will ove
        #define    _v_min_CURRENT_TOL_ma_b3_ui    current_ma_b3_ui(  250 )
        #define    _v_max_CURRENT_ma_b3_ui        current_ma_b3_ui( 1600 )     //Default...Calibration will ove
        #define    _v_max_CURRENT_TOL_ma_b3_ui    current_ma_b3_ui(  250 )

65      #define    _gain_MA_PER_RPM_b3_uc         gain_b3_ui( 13.8 )

#define    _AUTO_GNDSPD_THR_LO_mph_d1     velocity_mph_d1_ui( 2.50 )   // if ground speed falls below _
        #define    _AUTO_GNDSPD_THR_HI_mph_d1     velocity_mph_d1_ui( 3.00 )   // if ground speed rises above _

70      #define    _reel_dump_on              iomap_HSDpwmout_L35_reel_dump_solenoid=1
        #define    _reel_dump_off             iomap_HSDpwmout_L35_reel_dump_solenoid=0
        #define    _low_side_for_PTO_power_relay_on  iomap_LSDout_K23_low_side_for_PTO_power=0
        #define    _hdr_emerg_stop_debounced     iomap_digin_swstate_S17_hdr_pto_emerg_stop.debounced 75      #define    _ratio_reel_rpm_to_mph_b3     gain_b3_si( 8.003 )          // Reel rpm / mph   Notes: 1m // ENUMERATIONS
80  // UNITS
/***************/
    MAPPING
/***************/
85  // REFERENCES:

// INPUTS: DIGITAL - POSITIVE LOGIC...ON = NON-ZERO...OFF = 0.

90  // INPUTS: ANALOG define    _v_gnd_mph_d1              Gnd_speed_x_ten.filtered              //rstross20020ct020702
        #define    _v_setpt_rpm_b0            reel_switch_setpoint_status_b0_ui()   // _state_MAN
        #define    _i_setpt_ma_b3             reel_switch_setpoint_status_b0_ui()   // _state_ICNTRL
        #define    _ratio_reel_mph_to_gnd_mph_b0    reel_switch_setpoint_status_b0_ui()  // _state_AUTO 110% to 130
95      #define    _reel_speed_inc_dec_lh     ( iomap_digin_swstate_S20_reel_speed_incr.lh || iomap_digin_swsta

// OUTPUTS: DIGITAL - POSITIVE LOGIC...ON = NON-ZERO...OFF = 0.

100 // OUTPUTS: PWM TYPE

```
      VARIABLES
      **************/
105   // GLOBAL SCOPE
        unsigned char reel_v_observed_rpm_b0_uc;

110   // MODULE SCOPE
        static unsigned int       reel_speed_auto_rpm_b3_ui;
        static unsigned int       reel_timer01;
        static signed int         prev_reel_rpm_b0_si;
        static unsigned char      interactive_cal_proceed_flag_b0_uc;
115     static unsigned char      state_prev;
        static unsigned int       i_out_ma_b3;
        static signed long        integrator_b12;
        static enum reel_cal_states    reel_cal_state_b0_ui;
        static unsigned int       prev_reel_cal_state_b0_ui;
120     static enum reel_cntrl_states  reel_cntrl_state_b0_ui;

static struct UFOX_FN FN1[] = {
                                        ( _v_MIN_RPM_b3 - 1,     0, current_ma_b3_ui( 0 ),
                                        ( _v_MIN_RPM_b3,         1, current_ma_b3_ui( 0 ),
                                        ( _v_MAX_RPM_b3,            current_ma_b3_ui( 0 ),
125                                                       65535, current_ma_b3_ui( 0 ),
                                      };

130   /*************
      FUNCTION PROTOTYPING - MODULE SCOPE
      *************/
        static void        reel_cntrl_init( void );
135     static void        reel_cntrl_main( void );
        static unsigned int  v_to_i( unsigned int );
        static void        reel_calibrate( void );

140   /******************************************************************/
      void reel_cntrl( const unsigned int machine_mode_b0_ui )
      {
145     switch( machine_mode_b0_ui )
        {
          case INIT_main_STATE_MACHINE:
          case CRITICAL_EE_VARS_OUT_OF_BOUNDS:
          case WAKEUP_TEST_OUTPUTS:
          case WAKEUP_LIGHTS_ONLY:
150       case NORMAL_ENGINE_OFF:
          case NORMAL_ENGINE_STARTING:
          case DIAG_N_SETUP_ENGINE_OFF:
          case POWER_DOWN:
```

Fig. 5

```
        case XCM_SETUP:
155         break;        // do nothing case WAKEUP_APPLICATION_INIT:
            reel_cntrl_init();
160         break;

case NORMAL_ENGINE_RUNNING:
            reel_cntrl_main();
            break;
165     case CALIBRATION_ENGINE_STARTING:
        case CALIBRATION_ENGINE_RUNNING:
            reel_calibrate();
            break;
170     }
    }

/*****************************************************************/
175 void reel_cntrl_ee_validation(void)
    {
        if
        (
180        ( ee_reel_pt1_current_ma_b3_ui < (_v_min_CURRENT_ma_b3_ui - _v_min_CURRENT_TOL_ma_b3_ui) )
        || ( ee_reel_pt1_current_ma_b3_ui > (_v_min_CURRENT_ma_b3_ui + _v_min_CURRENT_TOL_ma_b3_ui) )
        )
            ee_reel_pt1_current_ma_b3_ui = _v_min_CURRENT_ma_b3_ui;

if
185     (
           ( ee_reel_pt2_current_ma_b3_ui < (_v_max_CURRENT_ma_b3_ui - _v_max_CURRENT_TOL_ma_b3_ui) )
        || ( ee_reel_pt2_current_ma_b3_ui > (_v_max_CURRENT_ma_b3_ui + _v_max_CURRENT_TOL_ma_b3_ui) )
        )
190         ee_reel_pt2_current_ma_b3_ui = _v_max_CURRENT_ma_b3_ui;
    }

/*****************************************************************/
    static void reel_cntrl_init( void )
195 {
        _reel_timer01 = 0;

FN1[0].y = current_ma_b3_ui(0);
        FN1[1].y = current_ma_b3_ui(0);
200     FN1[2].y = ee_reel_pt2_current_ma_b3_ui;
        FN1[3].y = ee_reel_pt2_current_ma_b3_ui;
        FN1[4].y = ee_reel_pt2_current_ma_b3_ui;
    }
```

*Fig. 6*

```
      /*******************************************************************/
205   static void  reel_cntrl_main( void )
      {
        unsigned int  _v_setpt_auto_rpm_b3;                          // function variable 210     _i_out_ma_b3 = current_ma_b3_si(0);                          // Output current defaulte if( Pto_control_state_b0_uc == PTO_STATE_OFF )               //Check for PTO running
          _reel_cntrl_state_b0_ui = REEL_CNTRL_STATE_OFF;

215     if( _reel_cntrl_state_b0_ui != _state_prev )
        {
          switch( _reel_cntrl_state_b0_ui )
          {
220         case REEL_CNTRL_STATE_MAN:
            case REEL_CNTRL_STATE_AUTO:
              _integrator_bl2 = 0;
              break;
225       }
        }
        // State Machine
        switch( _reel_cntrl_state_b0_ui )
        {
230       case REEL_CNTRL_STATE_OFF:
            _reel_speed_auto_rpm_b3_ui = 0;                          //reset reel speed to show zero
            // Inherent
            break;
235       case REEL_CNTRL_STATE_MAN:
            _i_out_ma_b3 = _v_to_i( _v_setpt_rpm_b0*BIN3 );
            break;
          case REEL_CNTRL_STATE_AUTO:
240         _v_setpt_auto_rpm_b3 = (unsigned int)(( ((unsigned long)_v_gnd_mph_d1) * _ratio_reel_rpm_to_mph_b3 * (
              if( ee_reel_manual_set_pt_b0_uc*BIN3 > velocity_rpm_b3_ui( 50.00 ) )
              {
                if( _v_setpt_auto_rpm_b3 < velocity_rpm_b3_ui( 50.00 ) )
245             {
                  _i_out_ma_b3 = _v_to_i( velocity_rpm_b3_ui( 50.00 ) );     //man reel setpoint > 50 rpm...set
                  _reel_speed_auto_rpm_b3_ui = velocity_rpm_b3_ui( 50.00 );  //clamp reel speed @ 50 rpm
                }
                else
250             {
                  _i_out_ma_b3 = _v_to_i( _v_setpt_auto_rpm_b3 );
                  if( _v_setpt_auto_rpm_b3 > velocity_rpm_b3_ui( 78.00 ) )
                    _reel_speed_auto_rpm_b3_ui = velocity_rpm_b3_ui( 78.00 );  //clamp reel speed @ 78 rpm...set
                  else
255               _reel_speed_auto_rpm_b3_ui = _v_setpt_auto_rpm_b3;           //show reel speed > 50 rpm
```

Fig. 7

```
                )
            }
            else
            {
260             if( _v_setpt_auto_rpm_b3 < ee_reel_manual_set_pt_b0_uc*BIN3 )
                {
                    _i_out_ma_b3 = _v_to_i( ee_reel_manual_set_pt_b0_uc*BIN3 );
                    _reel_speed_auto_rpm_b3_ui = ee_reel_manual_set_pt_b0_uc*BIN3;    //clamp reel speed @ manual reel
                }
265             else
                {
                    _i_out_ma_b3 = _v_to_i( _v_setpt_auto_rpm_b3 );
                    if( _v_setpt_auto_rpm_b3 > velocity_rpm_b3_ui( 78.00 ) )
                        _recl_speed_auto_rpm_b3_ui = velocity_rpm_b3_ui( 78.00 );     //clamp reel speed @ 78 rpm
270                 else
                        _reel_speed_auto_rpm_b3_ui = _v_setpt_auto_rpm_b3;            //show reel speed > manual reel
                }
            }
275 #ifdef engr_data_acq_hyd_reel_01   //rps2005feb151103
    CAN_test_data2[0].word = _v_gnd_mph_d1;
    CAN_test_data2[1].word = _v_setpt_auto_rpm_b3;
    CAN_test_data2[2].word = _i_out_ma_b3;
    CAN_test_data2[3].word = _ratio_reel_mph_to_gnd_mph_b0;
280 #endif break;

case REEL_CNTRL_STATE_ICNTRL:
285             _i_out_ma_b3 = _i_setpt_ma_b3;
                break;

}
290     _state_prev = _reel_cntrl_state_b0_ui;

Reel_Icntrl_setpt(_i_out_ma_b3);                    // Output current passed to Icntrl Loop:

}
295 //****************************************************
    int* reel_get_state_pi( void )
    {
    /*
300 Description:
    */
        return(&_reel_cal_state_b0_ui);
    }
305 /*****************************************************/
```

Fig. 8

```
static void reel_calibrate( void )
{
    static unsigned char  _update_display_flag_b0_uc;
    static const void*    _reel_cal_msg;

#define  _reel_wait       _time_b0_ui2scans_sec_f( 1 )    //set timer to aquivalent scans
    #define  _msg_wait        _time_b0_ui2scans_sec_f( 5 )    //set timer to aquivalent scans

310

315  switch( _reel_cal_state_b0_ui )
     {
       case _REEL_CAL_STATE_INIT:                //Wait here until reel Calibration is requested
320       _i_out_ma_b3=0;
          _reel_dump_off;
          return;

case _REEL_CAL_STATE_START_CALIBRATION:
325       _i_out_ma_b3 = 0;
          _reel_dump_off;
          _reel_cal_msg = _cal_start_eng_menu;
          _reel_cal_state_b0_ui = _REEL_CAL_STATE_START_ENGINE;
          if( !hyd_reel_installed_b_xp || ( ee_header_type_nbl != header_type_SICKLE_xp ) )   //TBD - jpeters2004J
330       {
              _reel_cal_state_b0_ui = _REEL_CAL_STATE_CHECK_CONFIG;
              _reel_timer01=0;
          }
          else
              _reel_cal_state_b0_ui = _REEL_CAL_STATE_START_ENGINE;
335       break;

case _REEL_CAL_STATE_START_ENGINE:
          _reel_dump_off;
          if( NeuStart_status_bt_xp() )
340       {
              menu_change_focus( _cal_start_eng_menu, _type_menu_e );
              _reel_cal_state_b0_ui = _REEL_CAL_STATE_WAIT_FOR_ENG_RUNNING;
          }
          else
345       {
              menu_change_focus( get_neustart_message(), _type_menu );
          }
          break;

case _REEL_CAL_STATE_WAIT_FOR_ENG_RUNNING:
350       _reel_dump_off;
          if( !NeuStart_status_bt_xp() )
              _reel_cal_state_b0_ui = _REEL_CAL_STATE_START_ENGINE;
          if( engine_running_b_xp )
355           _reel_cal_state_b0_ui = _REEL_CAL_STATE_WAIT_FOR_HI_IDLE;
          break;
```

*Fig. 9*

```
      case _REEL_CAL_STATE_WAIT_FOR_HI_IDLE:
        _reel_dump_off;
        if( _6_cylinder_b_xp )
        (
360
          _reel_cal_msg = _increase_engine_speed_2150_menu;
          throttle_set_point( 2200 );                                  //Set Engine Speed to 2150 rp
365       if( engine_oil_pressure_bt_xp && engine_v_eng_rpm_b0.filtered > 2100 )
          (
            if( ++_reel_timer01 > _time_b0_ui2scans_sec_f( 2 ) )
            (
              _reel_cal_state_b0_ui = _REEL_CAL_STATE_WAIT_FOR_REEL_INC;
370         )
          )
        else
        (
          _reel_cal_msg = _increase_engine_speed_2300_menu;            //Display a message to increa
375       if( engine_oil_pressure_bt_xp && engine_v_eng_rpm_b0.filtered > 2250 )
            _reel_cal_state_b0_ui = _REEL_CAL_STATE_WAIT_FOR_REEL_INC;
        )
380     break;

case _REEL_CAL_STATE_WAIT_FOR_REEL_INC:
        _reel_dump_off;
        _low_side_for_PTO_power_relay_on;                              //turn on LSD to look for PTO
        _reel_cal_msg = _reel_cal_wait_menu;
385     if( _hdr_emerg_stop_debounced )
          _reel_cal_state_b0_ui = _REEL_CAL_STATE_SAY_WE_ARE_CALIBRATING;
        break;

case _REEL_CAL_STATE_SAY_WE_ARE_CALIBRATING:
390     _reel_dump_off;
        _low_side_for_PTO_power_relay_on;                              //turn on LSD to look for PTO
        _reel_cal_msg = _reel_cal_running_menu;
        _i_out_ma_b3 = _reel_pt1_current_ma_b3_ui;
395     if( _interactive_cal_proceed_flag_b0_uc )                      //Qued from <ENTER> key...
        (
          _reel_timer01 = 0;
          _reel_cal_state_b0_ui = _REEL_CAL_STATE_001;
400     )
        break;

case _REEL_CAL_STATE_001:
        _reel_dump_on;
        _low_side_for_PTO_power_relay_on;                              //turn on LSD to look for PTO
        _reel_cal_msg = _reel_cal_03_menu;
405     _i_out_ma_b3 = ee_reel_pt1_current_ma_b3_ui;
        if( ++_reel_timer01 > _time_b0_ui2scans_sec_f( 60 ) )
        (
```

Fig. 10

```
                Alarm_OneShot_1sec();
                reel_v_observed_rpm_b0_uc = _v_MIN_RPM_b3/BIN3;
410             _reel_timer01 = 0;
                _reel_cal_state_b0_ui = _REEL_CAL_STATE_002;
            }
            break;

415     case _REEL_CAL_STATE_002:
            _reel_dump_off;
            _low_side_for_PTO_power_relay_on;                    //turn on LSD to look for PTO
            _reel_cal_msg = _reel_cal_01_menu;
420         if( _interactive_cal_proceed_flag_b0_uc )            //Qued from <ENTER> key...
            {
                if( reel_v_observed_rpm_b0_uc > _v_MIN_RPM_b3/BIN3 )
                    ee_reel_pt1_current_ma_b3_ui
425                 =
                    ee_reel_pt1_current_ma_b3_ui
                    -
                    (   ( reel_v_observed_rpm_b0_uc - (_v_MIN_RPM_b3/BIN3) )
                        * _gain_MA_PER_RPM_b3_uc
                    )
430                 ;
                else
                    ee_reel_pt1_current_ma_b3_ui
                    =
                    ee_reel_pt1_current_ma_b3_ui
435                 +
                    (   ( (_v_MIN_RPM_b3/BIN3) - reel_v_observed_rpm_b0_uc )
                        * _gain_MA_PER_RPM_b3_uc
                    )
                    ;
440
                _reel_cal_state_b0_ui = _REEL_CAL_STATE_003;
            }
            break;

445     case _REEL_CAL_STATE_003:
            _reel_dump_on;
            _low_side_for_PTO_power_relay_on;                    //turn on LSD to look for PTO switch
            _reel_cal_msg = _reel_cal_running_menu;
450         _i_out_ma_b3 = ee_reel_pt2_current_ma_b3_ui;
            if( _interactive_cal_proceed_flag_b0_uc )            //Qued from <ENTER> key...
            {
                _reel_timer01 = 0;
                _reel_cal_state_b0_ui = _REEL_CAL_STATE_004;
            }
            break;

455     case _REEL_CAL_STATE_004:
```

Fig. 11

```
460    _reel_dump_on;                              //turn on LSD to look for PTO switch
       _low_side_for_PTO_power_relay_on;
       _reel_cal_msg = _reel_cal_03_menu;
       _i_out_ma_b3 = ee_reel_pt2_current_ma_b3_ui;
       if( ++_reel_timer01 > _time_b0_ui2scans_sec_f( 30 ) )
465    {
           Alarm_OneShot_1sec();
           reel_v_observed_rpm_b0_uc = _v_MAX_RPM_b3/(BIN3*2);
           _reel_timer01 = 0;
           _reel_cal_state_b0_ui = _REEL_CAL_STATE_005;
470    }
       break;

case _REEL_CAL_STATE_005:
           _reel_dump_off;
475        throttle_set_point( 900 );               //Set Engine Speed to n rpm
           _reel_cal_msg = _reel_cal_02_menu;

if( _interactive_cal_proceed_flag_b0_uc ) //Qued from <ENTER> key...
           {
480            if( reel_v_observed_rpm_b0_uc > _v_MAX_RPM_b3/(BIN3*2) )
                   ee_reel_pt2_current_ma_b3_ui
                   =  (
                       ee_reel_pt2_current_ma_b3_ui
485                -  (
                       ( reel_v_observed_rpm_b0_uc*2 - (_v_MAX_RPM_b3/BIN3) )
                       * _gain_MA_PER_RPM_b3_uc
                   )
               );
490            else
                   ee_reel_pt2_current_ma_b3_ui
                   =  (
                       ee_reel_pt2_current_ma_b3_ui
                   +  (
495                    ( (_v_MAX_RPM_b3/BIN3) - reel_v_observed_rpm_b0_uc*2 )
                       * _gain_MA_PER_RPM_b3_uc
                   )
               );
               _reel_cal_state_b0_ui = _REEL_CAL_STATE_PASSED;
500        }
           break;

case _REEL_CAL_STATE_PASSED:
           _i_out_ma_b3 = 0;
505        _reel_dump_off;
           _reel_cal_msg = _cal_success_menu;
           if( ++_reel_timer01 > __msg_wait )
           {
               _reel_timer01 = 0;
510            _reel_cal_state_b0_ui = _REEL_CAL_STATE_EXIT;
```

Fig. 12

```
        }
        break;

515     case _REEL_CAL_STATE_FAILED:
            _i_out_ma_b3 = 0;
            _reel_dump_off;
            _reel_cal_msg = _cal_failed_menu;
            Alarm_OneShot_1sec();
            if( ++_reel_timer01 > __msg_wait )
520         (
                _reel_timer01 = 0;
                _reel_cal_state_b0_ui = _REEL_CAL_STATE_EXIT;
            )
        break;

525     case _REEL_CAL_STATE_CHECK_CONFIG:
            _i_out_ma_b3 = 0;
            _reel_dump_off;
            _reel_cal_msg = _cal_check_config_menu;
            if( ++_reel_timer01 > __msg_wait )
530         (
                _reel_timer01 = 0;
                _reel_cal_state_b0_ui = _REEL_CAL_STATE_EXIT;
            )
535     break;

case _REEL_CAL_STATE_EXIT:
            _i_out_ma_b3 = 0;
            _reel_dump_off;
            _reel_cal_msg = _cal_ended_key_off;
540         if( ++_reel_timer01 > __msg_wait )
            (
                _reel_timer01 = 0;
            )
        break;

545     if( __update_display_flag_b0_uc == 1 )
        (
            menu_change_focus( _reel_cal_msg, _type_menu_e );     //Pass message pointer to display handler only on
            __update_display_flag_b0_uc = 0;
550     )

if( _reel_cal_state_b0_ui != _prev_reel_cal_state_b0_ui )
            __update_display_flag_b0_uc = 1;

555     _prev_reel_cal_state_b0_ui = _reel_cal_state_b0_ui;      //jpeters2004Apr201201   Default calibration procee
        _interactive_cal_proceed_flag_b0_uc = 0;

560     Reel_Icntrl_setpt(_i_out_ma_b3);                          // Output current passed to Icntrl Loop:
        )
```

*Fig. 13*

```
/************************************************************/
void reel_goto_calibration( void )
{
565    _reel_cal_state_b0_ui = _REEL_CAL_STATE_START_CALIBRATION;
       main_request_engine_running_cal();
}
/************************************************************/
void reel_calibration_exit( void )
{
570    _reel_cal_state_b0_ui = _REEL_CAL_STATE_FAILED;
575 }
/************************************************************/
void reel_calibration_proceed( void )
{
       _interactive_cal_proceed_flag_b0_uc = 1;
580 }
/************************************************************/
void reel_cntrl_state_modified_to( unsigned int new_state_b0_ui )
{
       _reel_cntrl_state_b0_ui = new_state_b0_ui;
585 }
/************************************************************/
static unsigned int _v_to_i(unsigned int X)
{
590 /*
    Description: Nominal v to current: Convert velocity to current
    */
       return( UFOXW(FN1, X) );    //jpeters2004Feb201214 See FN1...FNx above.  Table initialization was moved to acc
595 }
/************************************************************/
unsigned int reel_speed_rpm_auto_mode_b3_ui( void )
{
600    return( _reel_speed_auto_rpm_b3_ui );
}
```

*Fig. 14*

```
/*
    MODULE:         Reel_Switch.005.c

DESCRIPTION:    Reel Switch State Control.

OPEN ISSUES:

REVISION HISTORY:

Reel_Switch.005.c- 12-Apr-2004 rfackler
        jpeters2004Mar241746   Added check for hydraulic reel enable from menu and user prompt to manually engage re
        jpeters2003Apr161633   Added auto increment function to scroll through reel speed faster in Manual mode
        jpeters2003Feb130820   Changed auto increment values for manual and automatic modes
        10-Jun-2002  (rfackler) Module created
*/ include "CAN1_out.h"
include "changes.h"
#include "iomap_appl.h"
#include "main.h"
#include "Menu.h"
#include "MFH_map.h"
#include "OnDemand.h"
#include "PTO_switch.h"
#include "reel_cntrl.h"
#include "reel_switch.h"
#include "seat_switch.h"
#include "sys_vars.h"
#include "Timer.h"
#include "wigtest.h"

/***************
    DEFINITIONS
***************/

// CONSTANT define  MAX_REEL_AUTO_SETPOINT      130
    #define  MIN_REEL_AUTO_SETPOINT      100 ifdef  FIX_REEL_SPEED_LAB_SUPPORT
    #define  MAX_REEL_MANUAL_SETPOINT    velocity_rpm_b0_si( 100 )    //mkc2005feb090712
    #define  MIN_REEL_MANUAL_SETPOINT    velocity_rpm_b0_si( 40  )
#else //FIX_REEL_SPEED_LAB_SUPPORT
    #define  MAX_REEL_MANUAL_SETPOINT    velocity_rpm_b0_si( 70 )    // reel at 250% of ground speed  jpete
    #define  MIN_REEL_MANUAL_SETPOINT    velocity_rpm_b0_si( 20 )    // reel at 100% of ground speed
```

Fig. 15

```
endif    //FIX_REEL_SPEED_LAB_SUPPORT define  _AUTO_WAIT_INIT           _time_b0_ui2scans_sec_f( 1.0 )
55  #define  _DOUBLE_HIT_WAIT          _time_b0_ui2scans_sec_f( 0.3 )

// ENUMERATIONS enum _reel_switch_states( _STARTUP_DELAY,        //state 0
60                             _INIT,                 //state 1
                               _REEL_START,           //state 2
                               _TEST_REEL_MODE,       //state 3
                               _AUTOMATIC,            //state 4
                               _AUTOMATIC_INCR_01,    //state 5
                               _AUTOMATIC_INCR_02,    //state 6
65                             _AUTOMATIC_DECR_01,    //state 7
                               _AUTOMATIC_DECR_02,    //state 8
                               _MANUAL,               //state 9
                               _MANUAL_INCR_01,       //state 10
                               _MANUAL_INCR_02,       //state 11
70                             _MANUAL_DECR_01,       //state 12
                               _MANUAL_DECR_02        //state 13
                              );

75  // UNITS

/****************
      MAPPING
80  ****************/

// REFERENCES:

// INPUTS: DIGITAL - POSITIVE LOGIC...ON = NON-ZERO...OFF = 0.
85  #define  _reel_speed_auto_debounced        iomap_digin_swstate_S27_reel_spd_mode_auto.debounced
    #define  _reel_speed_man_debounced         iomap_digin_swstate_S27_reel_spd_mode_man.debounced
    #define  _reel_speed_incr_debounced        iomap_digin_swstate_S20_reel_speed_incr.debounced
    #define  _reel_speed_decr_debounced        iomap_digin_swstate_S20_reel_speed_decr.debounced
    #define  _reel_speed_incr_lh               iomap_digin_swstate_S20_reel_speed_incr.lh
90  #define  _reel_speed_decr_lh               iomap_digin_swstate_S20_reel_speed_decr.lh
    #define  _hdr_emerg_stop_debounced         iomap_digin_swstate_S17_hdr_pto_emerg_stop.debounced

// INPUTS: ANALOG

95  // OUTPUTS: DIGITAL - POSITIVE LOGIC...ON = NON-ZERO...OFF = 0.

#define  _reel_dump_on                     iomap_HSDpwmout_L35_reel_dump_solenoid=1

100 // OUTPUTS: PWM TYPE
```

Fig. 16

```c
/***************
 *   VARIABLES
 ***************/

// GLOBAL SCOPE

// MODULE SCOPE static  enum _reel_switch_states    _reel_switch_state_b0_ui;
        static  unsigned char               _reel_user_start_enable;
        static  unsigned int                _reel_engage_timer;
        static  unsigned int                _reel_switch_setpoint_b0_ui;

/***************
 * FUNCTION PROTOTYPING - MODULE SCOPE
 ***************/ static  void    reel_switch_state_main( void );
        static  void    reel_switch_state_machine_init( void );

/*******************************************************************/
void reel_switch_ee_validation( void )
{
    // EE testing and validation tests the setpoints if( ee_reel_mode_nbl >= _REEL_MODE_END_OF_LIST )
        ee_reel_mode_nbl = _REEL_MODE_MANUAL & 0x0f;

if(   ( ee_reel_automatic_set_pt_b0_uc % 2 )            // if not a multiple of 2 or out of ra
       || ( ee_reel_automatic_set_pt_b0_uc > MAX_REEL_AUTO_SETPOINT )
       || ( ee_reel_automatic_set_pt_b0_uc < MIN_REEL_AUTO_SETPOINT )
      )  ee_reel_automatic_set_pt_b0_uc = MIN_REEL_AUTO_SETPOINT;    // want a multiple of 2 if(   ( ee_reel_manual_set_pt_b0_uc % 1 )               // if not a multiple of 1 or out of ra
       || ( ee_reel_manual_set_pt_b0_uc > MAX_REEL_MANUAL_SETPOINT )
       || ( ee_reel_manual_set_pt_b0_uc < MIN_REEL_MANUAL_SETPOINT )
      )  ee_reel_manual_set_pt_b0_uc = MIN_REEL_MANUAL_SETPOINT;     // want a multiple of 1
}

/*******************************************************************/
void reel_switch( const unsigned int machine_mode_b0_ui )
{
    switch( machine_mode_b0_ui )
    {
        case INIT_main_STATE_MACHINE:
        case CRITICAL_EE_VARS_OUT_OF_BOUNDS:
```

Fig. 17

```
reel_switch.c
            case WAKEUP_TEST_OUTPUTS:
155         case WAKEUP_LIGHTS_ONLY:
            case NORMAL_ENGINE_OFF:
            case NORMAL_ENGINE_STARTING:
            case DIAG_N_SETUP_ENGINE_OFF:
            case CALIBRATION_ENGINE_STARTING:
160         case CALIBRATION_ENGINE_RUNNING:
            case POWER_DOWN:
            case XCM_SETUP:
                // do nothing
                break;
165         case WAKEUP_APPLICATION_INIT:
                reel_switch_state_machine_init();
170             break;
            case NORMAL_ENGINE_RUNNING:
                reel_switch_state_main();
175             break;
            }
        }
180     /******************************************************************/
        static void reel_switch_state_machine_init( void )
        {
            _reel_user_start_enable = _reel_engage_timer = 0;
185         _reel_switch_state_b0_ui = _STARTUP_DELAY;
        }
        /******************************************************************/
190     static void reel_switch_state_main( void )
        {
            static   unsigned int    _timer01, _timer02;
        #ifdef engr_data_acq_prop_reel_fault
195
        //CAN_test_data2[1].byte.lo ... reel speed incr/decr switch
            CAN_test_data2[1].byte.lo = 0x7f;
200         if(_reel_speed_incr_debounced)
                CAN_test_data2[1].byte.lo = 0xff;
            // if(_reel_speed_decr_debounced)
```

Fig. 18 reel_switch.c

```
205  //    CAN_test_data2[1].byte.lo = 0x00;

210  //CAN_test_data2[1].byte.hi ... reel speed man/auto switch
     // CAN_test_data2[1].byte.hi = 0x7f:
         if( _reel_speed_man_debounced )
         (
215  //     CAN_test_data2[1].byte.hi = 0x00;
            ee_reel_mode_nbl = _REEL_MODE_MANUAL & 0x0f;
         )
         if( _reel_speed_auto_debounced )
         (
220  //     CAN_test_data2[1].byte.hi = 0xff;
            ee_reel_mode_nbl = _REEL_MODE_AUTOMATIC & 0x0f;
         )
225  #else
         if( _reel_speed_man_debounced )
            ee_reel_mode_nbl = _REEL_MODE_MANUAL & 0x0f;

230      if( _reel_speed_auto_debounced )
            ee_reel_mode_nbl = _REEL_MODE_AUTOMATIC & 0x0f;

#endif
235      if( _reel_switch_state_b0_ui != _STARTUP_DELAY )
         (
            if
240         (
               !_hdr_emerg_stop_debounced
               |_6_cyl_pto_disc_b_xp
               |_hdr_switch_rev_debounc
               |seat_switch_inhibit_PTO_operation         // if Header PTO on
               |Pto_switch_inhibit_reel_operation_b0_uc   // if not a sickle
245            |!hyd_reel_installed_b_xp                  // header must be in FWD
                                                         // set == inhibit; out of seat
                                                         // set == inhibit; not running PTO
                                                         // No hydraulic reel installed
            ) _reel_switch_state_b0_ui = _INIT;
         )
250  //CAN_test_data[0].byte.lo = _reel_switch_state_b0_ui;
     //CAN_test_data[0].byte.hi = Reel_switch_CAN_msg_state;
     //CAN_test_data[1].byte.lo = _reel_speed_incr_debounced;
     //CAN_test_data[1].byte.hi = _reel_speed_decr_debounced;
     //CAN_test_data[2].word = ee_reel_automatic_set_pt_b0_uc;   //
255  //CAN_test_data[3].word = ee_reel_manual_set_pt_b0_uc;
```

Fig. 19 reel_switch.c

```
        //CAN_test_data2[0].word = _timer01;
        //CAN_test_data2[1].word = _timer02;

260     //CAN_test_data1[1].byte.lo = ee_reel_mode_b0_uc;
        //CAN_test_data1[1].byte.hi = ( ( _reel_speed_incr_debounced ) - ( _reel_speed_decr_debounced ) );
        //CAN_test_data1[2].word = _reel_switch_setpoint_b0_ui;
        //CAN_test_data1[3].word = Header_v_reel_rpm_b0.raw;

265     //CAN_test_data2[0].word = ee_reel_offset_current_ma_b1_si;
        //CAN_test_data2[1].word = ee_reel_pt2_current_ma_b3_si;
        //CAN_test_data2[2].word = ee_reel_pt3_current_ma_b3_si;
        //CAN_test_data2[3].word = ee_reel_pt4_current_ma_b3_si;

270     switch( _reel_switch_state_b0_ui )
        {
        case _STARTUP_DELAY:
            reel_cntrl_state_modified_to( REEL_CNTRL_STATE_OFF );
            reel_switch_setpoint_b0_ui =0;
275         if( ++_timer01 >= _time_b0_ui2scans_sec_f( 2.0 ) )
                _reel_switch_state_b0_ui = _INIT;
            break;

case _INIT:
280         reel_cntrl_state_modified_to( REEL_CNTRL_STATE_OFF );
            reel_switch_setpoint_b0_ui =0;
            _reel_engage_timer = 0;
            if ( hyd_reel_installed_b_xp )                          //Only proceed to test start if config set t
                _reel_switch_state_b0_ui = _REEL_START;
285     break;

case _REEL_START:
            reel_cntrl_state_modified_to( REEL_CNTRL_STATE_OFF );
            _reel_switch_setpoint_b0_ui =0;
290     if( hyd_reel_installed_b_xp )                               //If hyd reel not configured, sit and spin h
            {
            if( _reel_user_start_enable )                           //only start reel if menu config set and use
                _reel_switch_state_b0_ui = _TEST_REEL_MODE;
            else
295         {
            if( ++_reel_engage_timer < _time_b0_ui2scans_sec_f( 5 ) )
            {
            if( _reel_engage_timer==1 )                             //TBD - Do this for now since you can't curr
                OnDemand_add_message( od_message_33 );              //Prompt user to hit reel speed inc/dec swit
300         if ( _reel_speed_incr_lh || _reel_speed_decr_lh )
            {
                reel_user_start_enable = 1;                         //Set this flag here, it will clear with eve
                // _reel_engage_timer = 0;
                OnDemand_remove_message();                          //mchow26mar2004    Fig. 20
305             _reel_switch_state_b0_ui = _TEST_REEL_MODE;
            }
``` reel_switch.c

```
            }
            else
            {
310             _reel_engage_timer = _time_b0_ui2scans_sec_f( 5 );
                //If user chose not to engage reel, but config parameter is set, sit and spin here till PTO res
            }
        }
315     break;

case _TEST_REEL_MODE:
            _timer01 = _timer02 = 0;
            _reel_dump_on;                                              //jpeters2004Mar011046   Keep dump solenoid f
320         if( ee_reel_mode_nbl == _REEL_MODE_AUTOMATIC )
                _reel_switch_state_b0_ui = _AUTOMATIC;
            else if( ee_reel_mode_nbl == _REEL_MODE_MANUAL )
                _reel_switch_state_b0_ui = _MANUAL;
            else
325             _reel_switch_state_b0_ui = _INIT;                       // add this for robustnes break;

case _AUTOMATIC:
330         reel_cntrl_state_modified_to( REEL_CNTRL_STATE_AUTO );
            reel_switch_setpoint_b0_ui = ee_reel_automatic_set_pt_b0_uc;
            _reel_dump_on;                                              // reel dump solenoid
            if( _reel_speed_incr_1h )
            {
335             if( ee_reel_automatic_set_pt_b0_uc < MAX_REEL_AUTO_SETPOINT ) // test within limits
                    ee_reel_automatic_set_pt_b0_uc += 2;                // Field shows that 6% at 5.2 mph ~1rpm chan
                _reel_switch_state_b0_ui = _AUTOMATIC_INCR_01;
            }
            else if( _reel_speed_decr_1h )
340         {
                _reel_switch_state_b0_ui = _AUTOMATIC_DECR_01;
                if( ee_reel_automatic_set_pt_b0_uc > MIN_REEL_AUTO_SETPOINT ) // test within limits
                    ee_reel_automatic_set_pt_b0_uc -= 2;                // Field shows that 6% at 5.2 mph ~1rpm chan
            }
345         if( ee_reel_mode_nbl == _REEL_MODE_MANUAL )
                _reel_switch_state_b0_ui = _INIT;
        break;

case _AUTOMATIC_INCR_01:
350         reel_switch_setpoint_b0_ui = ee_reel_automatic_set_pt_b0_uc;//Increment has been hit, increment one unit
            _reel_dump_on;                                              // reel dump solenoid
            // show reel speed AUTOMATIC setpoint percentage on display
            OnDemand_add_message( od_message_04 );
            if( _reel_speed_incr_debounced )                            //Watch for switch held
355         {
                if( ++_timer01 > _AUTO_WAIT_INIT )
```

Fig. 21

```
reel_switch:
                (
360             _timer01 = 0;
                _reel_switch_state_b0_ui = _AUTOMATIC_INCR_02;
                )
                else
                (
365             _timer01=0;
                _reel_switch_state_b0_ui = _TEST_REEL_MODE;
                )
                if( ee_reel_mode_nbl == _REEL_MODE_MANUAL )
                (
370             _timer01 = 0;
                _reel_switch_state_b0_ui = _INIT;
                )
                break;
375     case _AUTOMATIC_INCR_02:
                _reel_dump_on;                                                          //Increment switch held, so auto-increment,
                if( _reel_speed_incr_debounced )                                        //Keep reel dump solenoid on
                (
380             if( ( ++_timer01 == 50 )                                                //Slow down the auto inc/dec
                && ( ee_reel_automatic_set_pt_b0_uc < MAX_REEL_AUTO_SETPOINT ) )
                (
                _timer01 = 0;
                ee_reel_automatic_set_pt_b0_uc += 2;
                if( ee_reel_automatic_set_pt_b0_uc > MAX_REEL_AUTO_SETPOINT )
385             ee_reel_automatic_set_pt_b0_uc = MAX_REEL_AUTO_SETPOINT;
                // show reel speed AUTOMATIC setpoint percentage on display
                OnDemand_add_message( od_message_04 );
                _reel_switch_setpoint_b0_ui = ee_reel_automatic_set_pt_b0_uc;
                )
                )
390             else
                _reel_switch_state_b0_ui = _TEST_REEL_MODE;
                if( ee_reel_mode_nbl == _REEL_MODE_MANUAL )
                _reel_switch_state_b0_ui = _INIT;
395             break;
        case _AUTOMATIC_DECR_01:
                _reel_switch_setpoint_b0_ui = ee_reel_automatic_set_pt_b0_uc;           //Decrement has been hit, increment one unit
                _reel_dump_on;                                                          // reel dump solenoid
                // show reel speed AUTOMATIC setpoint percentage on display
400             OnDemand_add_message( od_message_04 );
                if( _reel_speed_decr_debounced )
                (
                if( ++_timer01 > _AUTO_WAIT_INIT )                                      //Watch for switch held
                (
405             _timer01 = 0;
                _reel_switch_state_b0_ui = _AUTOMATIC_DECR_02;
                )
```

*Fig. 22*

```
reel_switch...

}
        else
        {
            _timer01 = 0;
            _reel_switch_state_b0_ui = _TEST_REEL_MODE;
        }
410
        if( ee_reel_mode_nbl == _REEL_MODE_MANUAL )
        {
            _timer01 = 0;
415         _reel_switch_state_b0_ui = _INIT;
        }
        break;
420 case _AUTOMATIC_DECR_02:
        _reel_dump_on;                                                  //Decrement switch held, so auto-increment,
        if( _reel_speed_decr_debounced )                                //Keep reel dump solenoid on
        {
425         if( ( ++_timer01 == 50 )                                    //Slow down the auto inc/dec
            && ( ee_reel_automatic_set_pt_b0_uc > MIN_REEL_AUTO_SETPOINT )
            )
            {
                _timer01 = 0;
430             ee_reel_automatic_set_pt_b0_uc -= 2;
                if( ee_reel_automatic_set_pt_b0_uc < MIN_REEL_AUTO_SETPOINT )
                    ee_reel_automatic_set_pt_b0_uc = MIN_REEL_AUTO_SETPOINT;
                // show reel speed AUTOMATIC setpoint percentage on display
                OnDemand_add_message( od_message_04 );
435             _reel_switch_setpoint_b0_ui = ee_reel_automatic_set_pt_b0_uc;
            }
        }
        else
            _reel_switch_state_b0_ui = _TEST_REEL_MODE;
440     if( ee_reel_mode_nbl == _REEL_MODE_MANUAL )
            _reel_switch_state_b0_ui = _INIT;
        break;

445 case _MANUAL:
        reel_cntrl_state_modified_to( REEL_CNTRL_STATE_MAN );
        _reel_switch_setpoint_b0_ui = ee_reel_manual_set_pt_b0_uc;
        _reel_dump_on;          // reel dump solenoid
        if( _reel_speed_incr_lh )
        {
450         if( ee_reel_manual_set_pt_b0_uc < MAX_REEL_MANUAL_SETPOINT )    // test within limits
                ee_reel_manual_set_pt_b0_uc += 1;
            _reel_switch_state_b0_ui = _MANUAL_INCR_01;
        }
        if( _reel_speed_decr_lh )
        {
455         if( ee_reel_manual_set_pt_b0_uc > MIN_REEL_MANUAL_SETPOINT )    // test within limits
                ee_reel_manual_set_pt_b0_uc -= 1;        // Field shows that 6% at 5.2 mph -1rpm chan
            _reel_switch_state_b0_ui = _MANUAL_DECR_01;
```

Fig. 23

```
reel_switch:

460            }
               if( ee_reel_mode_nbl == _REEL_MODE_AUTOMATIC )
                   _reel_switch_state_b0_ui = _INIT;
               break;

465        case _MANUAL_INCR_01:
               _reel_switch_setpoint_b0_ui = ee_reel_manual_set_pt_b0_uc;    //Increment has been hit, increment one unit
               _reel_dump_on;                                                 // reel dump solenoid
               // show reel speed MANUAL setpoint rpm on display
               OnDemand_add_message( od_message_03 );
470            if( _reel_speed_incr_debounced )
               {
                   if( ++_timer01 > _AUTO_WAIT_INIT )                         //Watch for switch held
                   {
                       _timer01 = 0;
475                    _reel_switch_state_b0_ui = _MANUAL_INCR_02;
                   }
               }
               else
               {
480                _timer01 = 0;
                   _reel_switch_state_b0_ui = _TEST_REEL_MODE;
               }
               if( ee_reel_mode_nbl == _REEL_MODE_AUTOMATIC )
485                _timer01 = 0;
                   _reel_switch_state_b0_ui = _INIT;
               break;

490        case _MANUAL_INCR_02:
               _reel_dump_on;                                                 //Increment switch held, so auto-increment,
               if( _reel_speed_incr_debounced )                               //Keep reel dump solenoid on
               {
                   if( ( ++_timer01 == 50 )                                   //Slow down the auto inc/dec
495                    && ( ee_reel_manual_set_pt_b0_uc < MAX_REEL_MANUAL_SETPOINT )
                   {
                       _timer01=0;
                       ee_reel_manual_set_pt_b0_uc += 5;
                       if( ee_reel_manual_set_pt_b0_uc > MAX_REEL_MANUAL_SETPOINT )
500                        ee_reel_manual_set_pt_b0_uc = MAX_REEL_MANUAL_SETPOINT;
                       // show reel speed MANUAL setpoint rpm on display
                       OnDemand_add_message( od_message_03 );
                       _reel_switch_setpoint_b0_ui = ee_reel_manual_set_pt_b0_uc;
                   }
               }
505            else
                   _reel_switch_state_b0_ui = _TEST_REEL_MODE;
               if( ee_reel_mode_nbl == _REEL_MODE_AUTOMATIC )
510                _reel_switch_state_b0_ui = _INIT;
```

Fig. 24

```
                break;

case _MANUAL_DECR_01:
                _reel_switch_setpoint_b0_ui = ee_reel_manual_set_pt_b0_uc;    //Decrement has been hit, decrement one unit
515             _reel_dump_on;                                                 // reel dump solenoid
                // show reel speed MANUAL setpoint rpm on display
                OnDemand_add_message( od_message_03 );
                if( _reel_speed_decr_debounced )
                {
520                 if( ++_timer01 > _AUTO_WAIT_INIT )                         //Watch for switch held
                    {
                        _timer01 = 0;
                        _reel_switch_state_b0_ui = _MANUAL_DECR_02;
                    }
                }
525             else
                {
                    _timer01 = 0;
                    _reel_switch_state_b0_ui = _TEST_REEL_MODE;
                }
530             if( ee_reel_mode_nbl == _REEL_MODE_AUTOMATIC )
                {
                    _timer01 = 0;
535                 _reel_switch_state_b0_ui = _INIT;
                }
                break;

case _MANUAL_DECR_02:
                _reel_dump_on;                                                 //Decrement switch held, so auto-increment,
                if( _reel_speed_decr_debounced )                               //Keep reel dump solenoid on
540             {
                    if( ( ++_timer01 == 50 )                                   //Slow down the auto inc/dec
                     && ( ee_reel_manual_set_pt_b0_uc > MIN_REEL_MANUAL_SETPOINT ) )
                    {
                        _timer01=0;
545                     ee_reel_manual_set_pt_b0_uc -= 5;
                        if( ee_reel_manual_set_pt_b0_uc < MIN_REEL_MANUAL_SETPOINT )
                            ee_reel_manual_set_pt_b0_uc = MIN_REEL_MANUAL_SETPOINT;
                        // show reel speed MANUAL setpoint rpm on display
550                     OnDemand_add_message( od_message_03 );
                        _reel_switch_setpoint_b0_ui = ee_reel_manual_set_pt_b0_uc;
                    }
                }
                else
555                 _reel_switch_state_b0_ui = _TEST_REEL_MODE;
                if( ee_reel_mode_nbl == _REEL_MODE_AUTOMATIC )
                    _reel_switch_state_b0_ui = _INIT;
                break;

560         default:
```

Fig. 25

```
                _reel_switch_state_b0_ui = __INIT;
                break;
         )
565 )

/***********************************************************************/
unsigned int reel_switch_setpoint_status_b0_ui( void )
570 {
         return( _reel_switch_setpoint_b0_ui );
    )

575 //*********************************************************************
void reel_input_wiggle( void )
{
         //check reel speed decrease switch
         if
580      (    iomap_digin_swstate_S20_reel_speed_decr.lh
         ||   iomap_digin_swstate_S20_reel_speed_decr.hl
         )
              wig_test_add_input( wig_test_s_20_decr_obj_idx );

585      //check reel speed increase switch
         if
         (    iomap_digin_swstate_S20_reel_speed_incr.lh
         ||   iomap_digin_swstate_S20_reel_speed_incr.hl
         )
590           wig_test_add_input( wig_test_s_20_incr_obj_idx );

//check automatic reel speed mode switch
         if
         (    iomap_digin_swstate_S27_reel_spd_mode_auto.lh
595      ||   iomap_digin_swstate_S27_reel_spd_mode_auto.hl
         )
              wig_test_add_input( wig_test_s_27_auto_obj_idx );

//check manual reel speed mode switch
600      if
         (    iomap_digin_swstate_S27_reel_spd_mode_man.lh
         ||   iomap_digin_swstate_S27_reel_spd_mode_man.hl
         )
605 )         wig_test_add_input( wig_test_s_27_man_obj_idx );
```

Fig. 26

APPARATUS AND METHOD TO VARY THE REEL SPEED VERSUS GROUND SPEED OF AN AGRICULTURAL WINDROWER

This application claims the benefit of U.S. Provisional Application Nos. 60/699,610, and 60/699,489, filed Jul. 15, 2005.

TECHNICAL FIELD

The present invention relates to agricultural windrowers and, more particularly, to apparatus and a method for varying reel speed versus ground speed for accommodating different or changing conditions, such as different crop conditions.

BACKGROUND OF THE INVENTION

U.S. Pat. No. 6,901,729, is incorporated herein by reference in its entirety. This patent describes a header flotation system that is referred to as "non-independent". Provisional Application Nos. 60/699,610, and 60/699,489, filed Jul. 15, 2005, are also incorporated herein by reference in their entirety.

A windrower typically consists of a self-propelled tractor or similar vehicle, and a cutting mechanism which is either towed by the tractor or carried thereby. The cutting mechanism carried by a windrower is typically referred to as a header, and is supported on the windrower by forwardly projecting arms. Briefly, the arms comprise elements of a lift and flotation mechanism or mechanisms operable for setting a height of the header above the ground or other surface over which the windrower moves, the flotation permitting the header to ride lightly up and over rises in the terrain during field operation.

Headers are typically available in a variety of configurations. Common elements of different headers include cutters operable for severing crops from the field. One typical cutting mechanism is a sickle cutter which includes a row of knives which extend across the width of the header and which are powered to move reciprocally sidewardly relative to a sidewardly extending array of fixed knives or bars, thereby effecting a cutting action. It is typically desirable for the cutters to operate at a constant speed, but, in operation, the cutting speed may vary as a result of changing conditions such as crop population, contact with the ground, or the like.

The sickle cutters may be accompanied by a reel disposed thereabove and rotatable for engaging the crop before cutting or other treatment, as is well-known in the art. It is of value to have a capability of varying the rotational speed of the reel versus ground speed to accommodate changing and different conditions, particularly crop conditions. In this regard, it is well-known to provide a capability for an operator to dial in a speed in revolutions per minute (rpm) using a speed selector dial, and for the reel to be rotated at the selected speed. A windrower may have the capability to be used with any of several headers, and the power required for driving the reel of a particular header at a selected speed may differ from that required for driving the reel of a different header.

A reel can be driven using a fluid drive, such as a fluid power takeoff (PTO), or a dedicated reel drive, of a windrower. A pump driven by the engine of the tractor provides pressurized fluid to the PTO system. The pump can be of a fixed displacement, the speed and direction of operation of the reel being controlled by one or more proportional solenoid controlled valves. Varying electrical current signals would be utilized for operating the solenoids, for rotating the reel at the desired speed and in the desired direction, and the electrical current required for driving the reel at a selected speed would need to be known, such that the controller controlling the solenoids can apply the correct current responsive to an operator command for achieving a selected speed. Reel speed will typically fall within a range between about 100% of the ground speed of the windrower, and 130 to 140% thereof.

It would be desirable to have an apparatus and method which enables varying the reel speed versus ground speed, particularly for varying reel speed within the range set forth above of between about 100% and 130 to 140% of ground speed. Additionally, it would be desirable to have an apparatus and method automatically operable for maintaining the reel speed at a selected percentage of ground speed during operation wherein the ground speed is varying. Further, it would be desirable to have an apparatus and method for automatically controlling reel speed, wherein the reel speed is not allowed to fall below a minimum value, even though the ground speed is decreased significantly, for instance, when the windrower is being slowed significantly for turning, or the like, such that when a stand of crop is contacted by the reel, the reel will not be moving so slow as to tend to push the crop away from the header.

SUMMARY OF THE DISCLOSURE

What is disclosed is an apparatus and method which enables selectably varying the reel speed versus ground speed, particularly for varying reel speed within the range set forth above of between about 100% and 130 to 140% of ground speed, and automatically maintaining the reel speed at the selected percentage of the ground speed as the ground is varied, but which will prevent the reel speed from falling below a certain value.

BRIEF DESCRIPTION OF THE DRAWINGS

The advantages of this invention will be apparent upon consideration of the following detailed disclosure of the invention, especially when taken in conjunction with the accompanying drawings wherein:

FIG. 3 is a written listing of steps of the preferred program of the invention;

FIG. 4 is a written listing of further steps of the preferred program of the invention;

FIG. 5 is a written listing of still further steps of the preferred program of the invention;

FIG. 6 is a written listing of still further steps of the preferred program of the invention; and FIG. 7 is a written listing of still further steps of the preferred program of the invention;

FIG. 8 is a written listing of still further steps of the preferred program of the invention;

FIG. 9 is a written listing of still further steps of the preferred program of the invention;

FIG. 10 is a written listing of still further steps of the preferred program of the invention;

FIG. 11 is a written listing of still further steps of the preferred program of the invention;

FIG. 12 is a written listing of still further steps of the preferred program of the invention;

FIG. 13 is a written listing of still further steps of the preferred program of the invention;

FIG. 14 is a written listing of still further steps of the preferred program of the invention;

FIG. 15 is a written listing of still further steps of the preferred program of the invention;

FIG. 16 is a written listing of still further steps of the preferred program of the invention;

FIG. 17 is a written listing of still further steps of the preferred program of the invention;

FIG. 18 is a written listing of still further steps of the preferred program of the invention;

FIG. 19 is a written listing of still further steps of the preferred program of the invention;

FIG. 20 is a written listing of still further steps of the preferred program of the invention;

FIG. 21 is a written listing of still further steps of the preferred program of the invention;

FIG. 22 is a written listing of still further steps of the preferred program of the invention;

FIG. 23 is a written listing of still further steps of the preferred program of the invention;

FIG. 24 is a written listing of still further steps of the preferred program of the invention;

FIG. 25 is a written listing of still further steps of the preferred program of the invention; and FIG. 26 is a written listing of still further steps of the preferred program of the invention.

DETAILED DESCRIPTION OF THE PREFERRED EMBODIMENTS

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already by widely known or used in the art by persons skilled in the art and each will likewise not therefore be discussed in significant detail.

Figure 1:
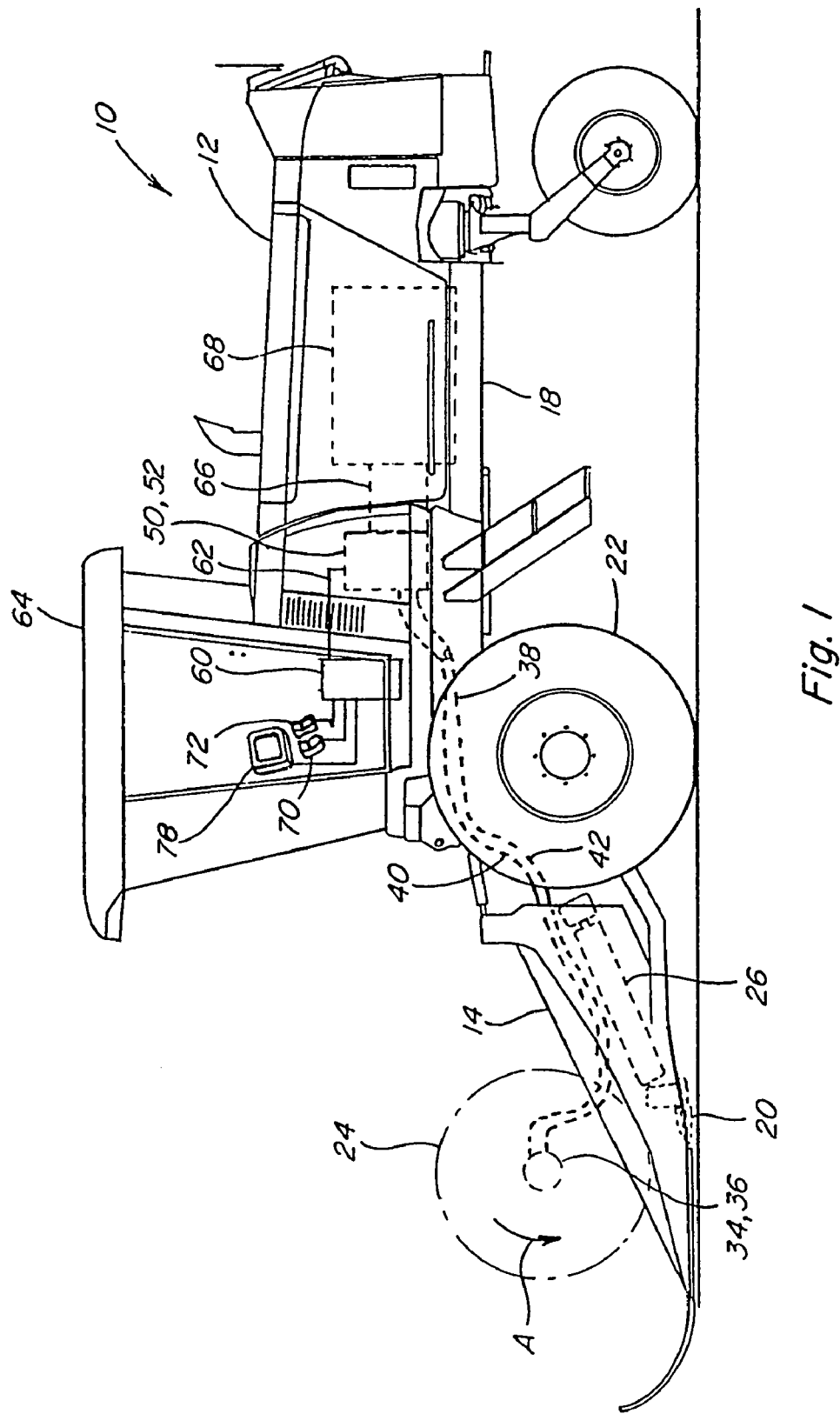
FIG. 1 is a side elevational view of a crop harvesting machine of the type with which the invention may be used, showing a header including a reel in connection with apparatus of the instant invention.

FIG. 1 shows the present invention utilized in connection with a self-propelled windrower 10; however, it will be appreciated that the principles of the present invention are not limited to a self-propelled windrower, or to any specific type of harvesting machine.

In the illustrated embodiment, the self-propelled windrower 10 comprises a tractor 12 and a header 14, header 14 being attached to the front end of a frame 18 or chassis of the tractor 12. The header may be of generally any suitable construction and design, and will include crop-harvesting mechanisms, such as a sickle cutter 20. Windrower 10 includes a propulsion driveline 22 controllably operable by an operator riding in an operator cab for propelling the windrower in a desired speed and direction. Header 14 additionally includes a reel 24 rotatable at a fixed or variable speed, as denoted by arrow A, for directing crops toward header 14 for harvesting by sickle cutter 20, as windrower 10 is moved over a field. A draper 26 comprising endless belts is disposed and operable for directing the harvested crop toward the center of header 14.

Reel 24 of header 14 is rotatably driven in direction A by a drive 34 which preferably includes a fluid motor 36. Fluid motor 36 is connected in fluid communication with a reel driveline 38 of tractor 12, by fluid lines 40 and 42, for receiving pressurized fluid therefrom. Sickle cutter 20 and draper 26 are separately driven utilizing any desired drive such as a fluid PTO drive, or the like.

Header 14 is removably mountable on a pair of lower arms 50 which extend forwardly from frame 18 of tractor 12, and which are movable upwardly and downwardly for positioning the header at a desired cutting height, or at an elevated transport position, using one or more lift cylinders (not shown), also in the well known manner. The upper end of the header is connected to frame 18 by an upper or center link connected to a mechanism operable for tilting the header to a desired orientation, again, in the well known manner.

Reel driveline 38 includes a fluid valve arrangement 52 controllably operable for directing pressurized fluid through fluid lines 40 and 42 as desired or required for powering reel 24. The flow of pressurized fluid to valve arrangement 52 is generated by a fixed displacement pump 66 driven by an engine 68 of windrower 10. Engine 68 also powers propulsion driveline 22 for propelling windrower 10.

Figure 2:
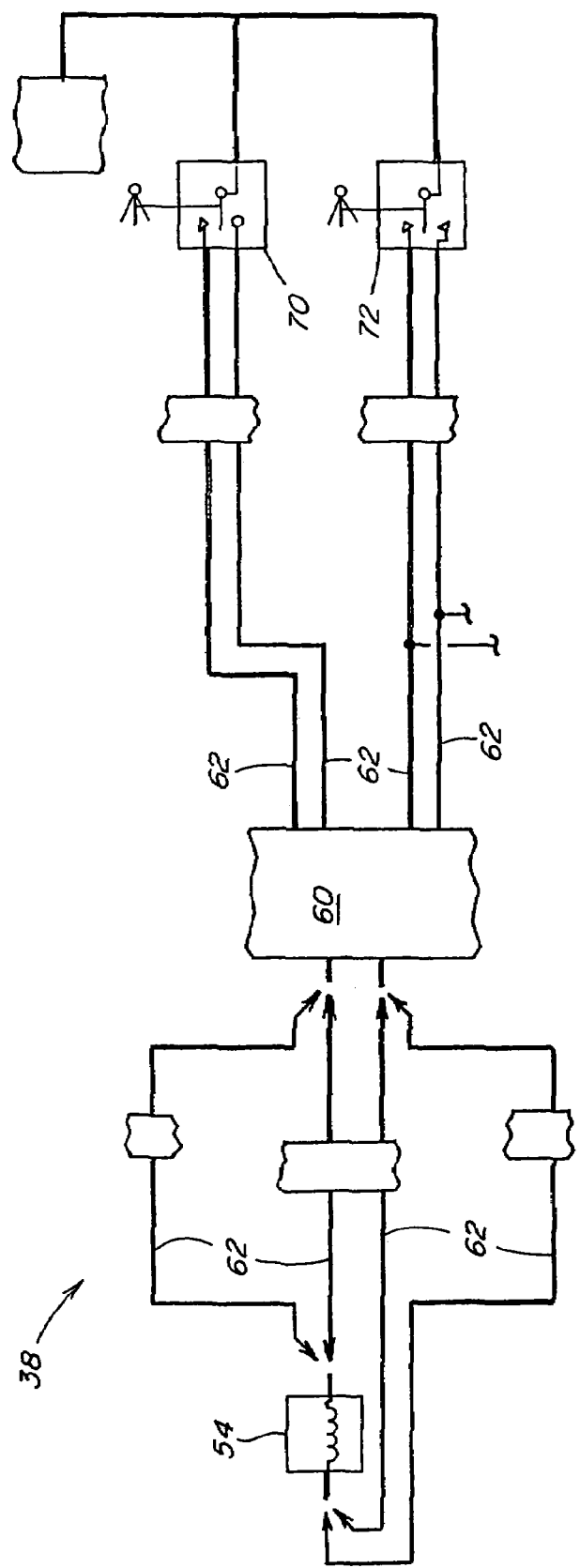
FIG. 2 is a schematic of a reel driveline of the machine of FIG. 1.

Referring also to FIG. 2, the flow of pump 66 to motor 36 is controlled by a reel speed proportional solenoid 54. Solenoid 54 is controlled by a control signal which is preferably an electrical signal, the electrical current value of which can be very precisely controllably varied through a range between zero and a greater amount. And, it is been found that reel driveline 38 can be configured such that the rotational speed of reel 24 will be linearly related to the electrical current value. Reel driveline 38 includes a programmable control module 60 connected to solenoid 54 by suitable conductive paths 62, which can be, for instance, wires of a wiring harness. Control module 60 is preferably a conventionally constructed and operable microprocessor based tractor control module, or the like, suitably located on tractor 12, such as in an operator cab 64. A reel speed mode switch 70 and a reel speed switch 72, are additionally connected to control module 60 by conductive paths 62. Reel speed mode switch 70 is operable by an operator for inputting command signals to control module 60 for initiating and selecting an operating mode of reel 24. Reel speed switch 72 is operable by an operator for increasing or decreasing and operating speed of reel 24. Additionally, a display device 78 is operable for displaying information relating to the operation of reel 24, as well as other systems of windrower 10. Switches 70 and 72, and display device 78, are located within operator cab 64.

Reel 24 can be driven at any speed within a range of from zero to about 80 rpm, and will typically be driven a speed between about 20 and 78 rpm. In this regard, if reel 24 is driven at a rotational speed wherein a lower radial outer periphery of the rotating reel is moving at a speed relative to the ground and crops to be harvested which is slower than the travel speed of header 14, the reel may have a tendency to engage and push the crops in the forward direction, away from sickle cutter 20, which is typically not desired. Instead, it is desired to direct the crop toward sickle cutter 20. As a result, in most instances, it will be desired to rotate reel 24 at a speed which propels the lower outer periphery of the reel at a speed in relation to the ground at least equal to the ground speed of header 14, which will also be the ground speed of windrower 10.

Propulsion driveline 22 includes a pair of drive wheels, the rotational speed of which is monitored to generate information representative of a ground speed of windrower 10. Therefore, the ground speed of windrower 10, at any time, can be known. Reel speed switch 72 can be utilized for inputting speed commands to control module 60, which, in turn, will output control signals to reel speed proportional solenoid 54 for delivering pressurized fluid to fluid motor 36 of drive 34. Given a known diameter of reel 24, the speed of the lower periphery of reel 24 can be determined from a rotational speed of the reel. If the speed of the lower periphery of the reel is determined, and the ground speed of the windrower is known, then the speed of the lower periphery relative to the ground can be determined. What is needed then, is a capability to determine a range of values for the control signal, that is, electrical current values, which will drive fluid motor 36 within a known range of speeds corresponding to a predicted range of ground speeds of windrower 10. This capability is provided by the steps of program disclosed in FIGS. 3 through 14.

Essentially, in a reel speed calibration mode the speed of engine 68 is automatically set and held. The engine speed is predetermined and will be sufficient for operating pump 66 at the system pressure for reel driveline 38. An emergency stop for preventing operation of PTO for driving sickle cutter 20 will be engaged. Then, an electrical control signal having a known first current value, will automatically be applied to solenoid 54 by control module 60. The first current value will preferably be sufficient for rotating reel 24 at a relatively slow speed. The number of rotations of reel 24 for a predetermined time interval, as driven by the first current value, will then be counted. This can be done by an operator observing and counting the rotations, or by a suitable speed sensor configured for determining the rotational speed of reel 24, if present. The count will then be entered into a register of control module 60. This can be done in a suitable manner, such as using a touchscreen feature of display device 78, if present, or utilizing one of the other switches, such as by jogging speed switch 72 to select a value.

When the count has been successfully entered, control module 60 will automatically apply a control signal to solenoid 54 having a predetermined second current value, which will preferably effect rotation of reel 24 at a faster speed than the first current value. The number of rotations of reel 24 for a predetermined time interval, as driven by the second current value, will then be counted. Again, this can be done by an operator observing and counting the rotations, or by a suitable speed sensor configured for determining the rotational speed of reel 24, if present. The count will then be entered into a register of control module 60.

Next, current set points will be determined. This will comprise the speeds of rotation of reel 24 for each of the first and second current values. Because the relationship of reel speed to current value can be configured to be substantially linear, a linear function for relationship defining the rotational speed of reel 24 as a function of electrical current value, can be determined. As a result, a rotational speed of reel 24 for a current value between the set points can be determined, as can rotational speeds beyond those set points, within a reasonable range. Again, if the rotational speed for a given current value is known, then the resulting speed of the periphery of reel 24 will be known.

With this information, that is, the ability to control the peripheral speed of reel 24, reel speed can be coordinated or matched with ground speed, as desired. Steps of the method of the invention for accomplishing this are set forth in the code listings of FIGS. 15 through 26. Reel speed mode switch 70 is operable according to the invention for selecting either manual or automatic control of reel speed. In a manual mode, control module 60 is programmed to allow a rotational speed of reel 24 of between about 20 rpm and about 78 rpm to be selected using reel speed switch 72, by jogging the switch to either increase or decrease the reel speed in one rpm increments. In the automatic mode, which can be initiated by placing reel speed mode switch 70 in an automatic mode, control module 60 is automatically operable for controlling the reel speed at a selected percentage of ground speed within a range of from about 100% to about 130% of ground speed. The percentage of ground speed is selectable by an operator using reel speed switch 72 when in the automatic mode. As a result, as the ground speed is varied, either by the operator, or as a result of other conditions, control module 60 will automatically vary the reel speed to maintain the selected percentage of the ground speed.

As an additional feature, control module 60 is programmed such that, in the automatic mode, the reel speed will not be allowed to fall below a certain stored value, which will be the greater of a predetermined set value, such as 50 rpm, or the lowest speed value set while previously in the manual mode. This is advantageous for instance, for performing a turning maneuver, because the reel speed will not be allowed to drop below the certain stored value, and when the header is brought in to contact with crop to be cut it will not be allowed to move so slow as to push the crop down.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions. Accordingly, the following claims are intended to protect the invention broadly as well as in the specific form shown.

What is claimed is:

1. A method of operation of a reel of an agricultural windrower, comprising steps of:

providing a windrower including a fluid pump in connection with a signal controlled device for controlling a pressurized fluid flow to a reel of a header of the windrower for rotating the reel;

providing a programmable control module in connection with the signal controlled device and operable for outputting control signals thereto having variable signal values for controlling a speed of rotation of the reel; and wherein the control module is programmed to operate in an automatic mode to automatically control the signal controlled device using a predetermined relationship between the signal values and the speed of rotation of the reel, wherein in the automatic mode the control module is configured to use the predetermined relationship to select a signal value corresponding to a desired reel speed as function of a ground speed of the windrower.

2. The method of claim 1, wherein the signal controlled device comprises a proportional solenoid controlled valve and the control signals comprise electrical currents and the rotational speeds of the reel are linearly related to the signal values of the electrical currents.

3. The method of claim 1, wherein the control module is programmed to be selectably operable in a manual mode by operation of an operator operable input device, for outputting control signals to the signal controlled device which are a function of input commands received from the input device.

4. The method of claim 1, wherein the control module when operating in the automatic mode will control the signal controlled device for rotating the reel at at least a predetermined minimum speed.

5. The method of claim 4, wherein the predetermined minimum speed comprises a speed previously selected by an operator and inputted to the control module.

6. The method of claim 4, wherein the predetermined minimum speed comprises a programmed speed value.

7. Apparatus for operating a reel of an agricultural windrower, comprising:
- a fluid pump and a signal controlled device operable for controlling a pressurized fluid flow to a reel of a header of the windrower for rotating the reel; and
- a programmable control module in connection with the signal controlled device and operable for outputting control signals thereto having variable signal values for controlling a speed of rotation of the reel, wherein the control module is programmed to operate in a selectable automatic mode to automatically control the signal controlled device using a predetermined relationship between the signal values and the speed of rotation of the reel wherein in the automatic mode the control module is configured to use the predetermined relationship to select a signal valued corresponding to a desired reel speed as function of a ground speed of the windrower.

8. Apparatus of claim 7, wherein the signal controlled device comprises a proportional solenoid controlled valve and the control signals comprise electrical currents and the rotational speeds of the reel are linearly related to the signal values of the electrical currents.

9. Apparatus of claim 7, wherein the control module is programmed to be selectably operable in a manual mode by operation of an operator operable input device, for outputting control signals to the signal controlled device which are a function of input commands received from the input device.

10. Apparatus of claim 7, wherein the control module when operating in the automatic mode will control the signal controlled device for rotating the reel at at least a predetermined minimum speed.

11. Apparatus of claim 10, wherein the predetermined minimum speed comprises a speed previously selected by an operator and inputted to the control module.

12. Apparatus of claim 10, wherein the predetermined minimum speed comprises a programmed speed value.

* * * * *